(12) United States Patent
Zhao et al.

(10) Patent No.: US 12,348,438 B2
(45) Date of Patent: Jul. 1, 2025

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 354 days.

(21) Appl. No.: 17/850,946

(22) Filed: Jun. 27, 2022

(65) Prior Publication Data

US 2022/0329368 A1    Oct. 13, 2022

Related U.S. Application Data

(63) Continuation of application No. PCT/CN2020/070330, filed on Jan. 3, 2020.

(51) Int. Cl.
  *H04L 5/00* (2006.01)
  *H04W 4/16* (2009.01)
  *H04W 72/0453* (2023.01)
  *H04W 76/14* (2018.01)

(52) U.S. Cl.
  CPC ............ *H04L 5/001* (2013.01); *H04L 5/0094* (2013.01); *H04W 4/16* (2013.01); *H04W 72/0453* (2013.01); *H04W 76/14* (2018.02)

(58) Field of Classification Search
  CPC ...... H04L 5/001; H04L 5/0094; H04W 76/14; H04W 4/16; H04W 72/0453
  USPC .............................................. 370/329
  See application file for complete search history.

(56) References Cited

U.S. PATENT DOCUMENTS

| | | | |
|---|---|---|---|
| 2019/0306923 A1 | 10/2019 | Xiong et al. | |
| 2020/0022089 A1* | 1/2020 | Guo | H04W 52/26 |
| 2020/0100215 A1* | 3/2020 | Li | H04L 5/0082 |

FOREIGN PATENT DOCUMENTS

| | | |
|---|---|---|
| CN | 110113786 | 8/2019 |
| CN | 110445597 | 11/2019 |
| WO | 2018157407 | 9/2018 |
| WO | 2019023857 | 2/2019 |

(Continued)

OTHER PUBLICATIONS

"Search Report of of counterpart Europe application No. 20909746.8", issued on Dec. 6, 2022, p. 1-p. 9.

(Continued)

*Primary Examiner* — Christopher R Crompton
(74) *Attorney, Agent, or Firm* — Hodgson Russ LLP

(57) ABSTRACT

A wireless communication method and a terminal device. The method comprises: a first terminal receiving, on N frequency domain resources, N sidelink data channels sent by a second terminal, wherein the N frequency domain resources correspond one-to-one to the N sidelink data channels, N is an integer greater than 1, and the frequency domain resources are carriers or bandwidth parts (BWP); and the first terminal sending, on M frequency domain resources, sidelink feedback information of the N sidelink data channels to the second terminal, where M is a positive integer, and M≤N.

20 Claims, 6 Drawing Sheets

200

The first terminal receives N sidelink data channels sent by the second terminal on the N frequency domain resources. The N frequency domain resources correspond one-to-one to the N sidelink data channels, the N is an integer greater than 1, and the frequency domain resources are carriers or bandwidth parts BWP. — S210

The first terminal sends the sidelink feedback information of the N sidelink data channels to the second terminal on M frequency domain resources, where the M is a positive integer, and M≤N. — S220

(56) References Cited

FOREIGN PATENT DOCUMENTS

WO     2019096275     5/2019
WO     2019098896     5/2019

OTHER PUBLICATIONS

LG Electronics, "Summary of email discussion on Rel-17 sidelink enhancement", 3GPP TSG RAN #86 RP-192745, Dec. 2019, pp. 1-27.
Apple, "Views on R17 Sidelink Enhancement", 3GPP TSG RAN Meeting #86 RP-192700, Dec. 2019, pp. 1-3.
"International Search Report (Form PCT/ISA/210) of PCT/CN2020/070330", mailed on Oct. 12, 2020, with English translation thereof, pp. 1-5.
"Written Opinion of the International Searching Authority (Form PCT/ISA/237) of PCT/CN2020/070330", mailed on Oct. 12, 2020, with English translation thereof, pp. 1-5.

\* cited by examiner

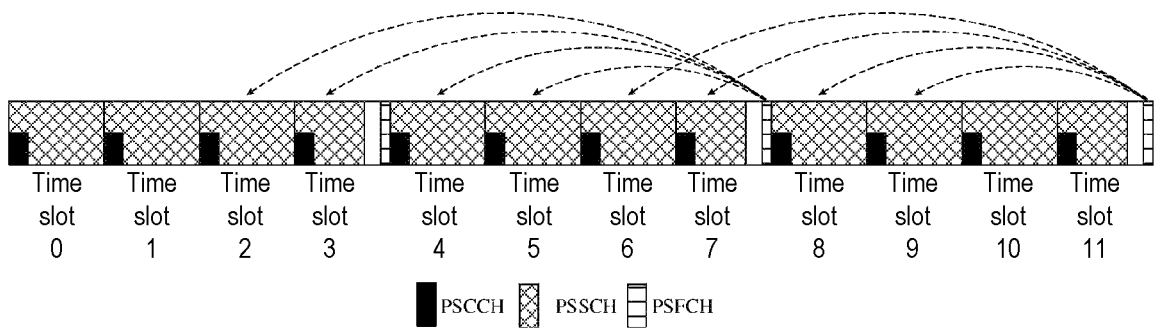

| The first terminal receives N sidelink data channels sent by the second terminal on the N frequency domain resources. The N frequency domain resources correspond one-to-one to the N sidelink data channels, the N is an integer greater than 1, and the frequency domain resources are carriers or bandwidth parts BWP. | ⟵ S210 |
|---|---|
| The first terminal sends the sidelink feedback information of the N sidelink data channels to the second terminal on M frequency domain resources, where the M is a positive integer, and M≤N. | ⟵ S220 |

FIG. 5

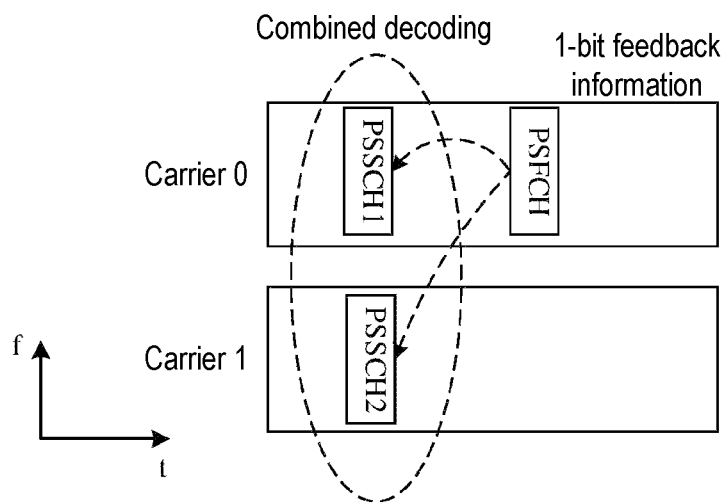

FIG. 6

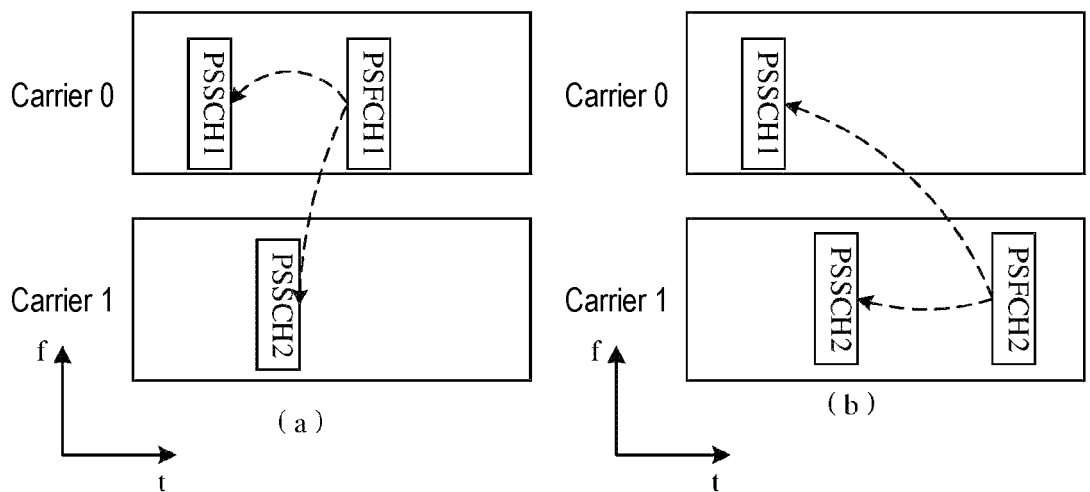

The first terminal receives N sidelink data channels sent by the second terminal on the N frequency domain resources. The N frequency domain resources correspond one-to-one to the N sidelink data channels, the N is an integer greater than 1, and the frequency domain resources are carriers or bandwidth parts BWP. — S310

The first terminal determines M frequency domain resources among the N frequency domain resources, where M is a positive integer, and M<N. — S320

The first terminal sends the sidelink feedback information of the N sidelink data channels to the second terminal on the M frequency domain resources. — S330

FIG. 12

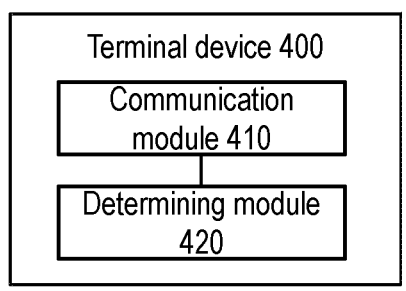

FIG. 13

WIRELESS COMMUNICATION METHOD AND TERMINAL DEVICE

CROSS-REFERENCE TO RELATED APPLICATION

This application is a continuation of international PCT application serial no. PCT/CN2020/070330, filed on Jan. 3, 2020. The entirety of the above-mentioned patent application is hereby incorporated by reference herein and made a part of this specification.

BACKGROUND

Technology Field

The embodiments of the application relate to the field of communications, and specifically, to a wireless communication method and a terminal device.

Description of Related Art

The Internet of Vehicles system is a sidelink (SL) transmission technology based on the long term evaluation device to device (LTE D2D). Different from the conventional LTE system in which communication data is received or sent through a base station, the Internet of Vehicles system adopts the method of terminal-to-terminal direct communication, so it has higher spectral efficiency and lower transmission delay.

In the Internet of Vehicles system, to improve the transmission reliability, a sidelink feedback channel is introduced. When the sidelink feedback is activated, a receiving terminal can send sidelink feedback information to a transmitting terminal, so that the transmitting terminal can determine whether to perform a retransmission according to the sidelink feedback information.

Currently, when considering that the Internet of Vehicles system supports multi-carrier sidelink transmission, for example, multiple carriers can transmit different sidelink data, which can improve the throughput of the system, or multiple carriers can transmit the same sidelink data, which can improve the reliability of data, then in this case, performing sidelink feedback to improve transmission reliability is an urgent problem to be solved.

SUMMARY

Embodiments of the application provide a wireless communication method and a terminal device, which can implement sidelink feedback of sidelink transmission on multiple carriers.

In a first aspect, a wireless communication method provided includes steps as follows. A first terminal receives N sidelink data channels sent by a second terminal on N frequency domain resources, wherein the N frequency domain resources correspond one-to-one to the N sidelink data channels, N is an integer greater than 1, and the frequency domain resources are carriers or bandwidth parts (BWPs).

The first terminal sends sidelink feedback information of the N sidelink data channels to the second terminal on M frequency domain resources, where M is a positive integer and M≤N.

In a second aspect, a wireless communication method provided includes steps as follows. A first terminal receives N sidelink data channels sent by a second terminal on N frequency domain resources, wherein the N frequency domain resources correspond one-to-one to the N sidelink data channels, N is an integer greater than 1, and the frequency domain resources are carriers or bandwidth parts (BWPs).

The first terminal determines M frequency domain resources among the N frequency domain resources, where M is a positive integer, and M<N.

The first terminal sends sidelink feedback information of the N sidelink data channels to the second terminal on the M frequency domain resources.

In a third aspect, a terminal device is provided for executing the method in the first aspect or any possible implementation of the first aspect. Specifically, the terminal device includes a unit for executing the method in the first aspect or any possible implementation of the first aspect.

In a fourth aspect, a terminal device is provided for executing the method in the second aspect or any possible implementation of the second aspect. Specifically, the terminal device includes a unit for executing the method in the second aspect or any possible implementation of the second aspect.

In a fifth aspect, a terminal device is provided, and the terminal device includes a processor and a memory. The memory is used to store a computer program, and the processor is used to call and run the computer program stored in the memory to execute the method in the first aspect or each implementation of the first aspect.

In a sixth aspect, a terminal device is provided, and the terminal device includes a processor and a memory. The memory is used to store a computer program, and the processor is used to call and run the computer program stored in the memory to execute the method in the second aspect or each implementation of the second aspect.

In a seventh aspect, a chip is provided for implementing the method in any one of the first aspect to the second aspect or each implementation of the first aspect to the second aspect.

Specifically, the chip includes a processor for calling and running a computer program from a memory, so that a device disposed with the chip executes the method in any one of the first aspect to the second aspect or each implementation of the first aspect to the second aspect.

In an eighth aspect, a computer-readable storage medium is provided for storing a computer program, and the computer program enables a computer to execute the method in any one of the first aspect to the second aspect or each implementation of the first aspect to the second aspect.

In a ninth aspect, a computer program product provided includes computer program instructions, and the computer program instructions enable a computer to execute the method in any one of the first aspect to the second aspect or each implementation of the first aspect to the second aspect.

In a tenth aspect, a computer program is provided. When run on a computer, the computer program enables a computer to execute the method in any one of the first aspect to the second aspect or each implementation of the first aspect to the second aspect.

Based on the above technical solution, the first terminal can receive physical sidelink shared channel (PSSCH) on multiple carriers and can further combine feedback information corresponding to multiple PSSCHs in one physical sidelink feedback channel (PSFCH) for feedback, which contributes to reducing the overhead of sidelink feedback.

BRIEF DESCRIPTION OF THE DRAWING

FIG. 4 is a schematic view of an example of sidelink feedback.

FIG. 5 illustrates a wireless communication method provided by an embodiment of the application.

FIG. 6 to FIG. 10 are schematic views of sidelink feedback according to embodiments of the application.

FIG. 11 is a schematic view illustrates how carriers are selected based on transmission time of PSSCH.

FIG. 12 is a schematic view of another wireless communication method provided by an embodiment of the application.

FIG. 13 is a schematic block diagram of a terminal device provided by an embodiment of the application.

DETAILED DESCRIPTION OF DISCLOSED EMBODIMENTS

Figure 1:
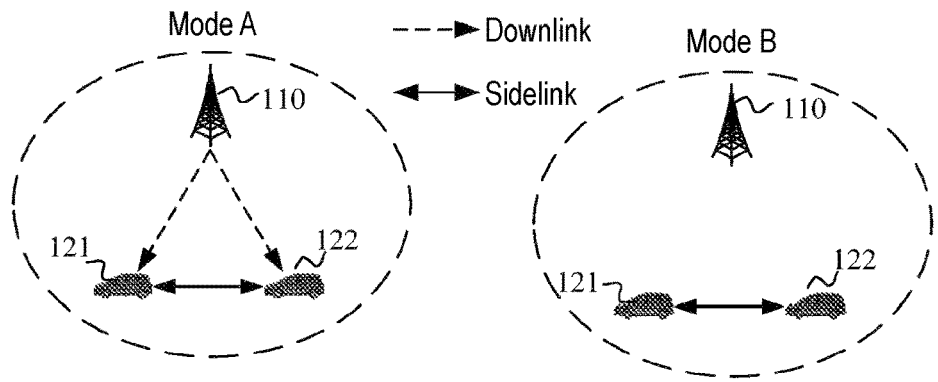
FIG. 1 is a schematic view of an application scenario provided by an embodiment of the application.

The technical solutions in the embodiments of the application are illustrated below with reference to the drawings in the embodiments of the application. Obviously, the illustrated embodiments are a part of the embodiments of the application but not all of the embodiments. According to the embodiments in the application, all other embodiments obtained by those ordinary skill in the art without creative work shall fall within the protection scope of the application.

It should be understood that the technical solutions of the embodiments of the application can be applied to a device to device (D2D) communication system, such as the Internet of Vehicles system based on long term evolution (LTE) for D2D communication, or an NR-V2X system. Different from the conventional LTE system in which the communication data between terminals is received or sent through network devices (e.g., base stations), the Internet of Vehicles system adopts the terminal-to-terminal direct communication method, so it has higher spectral efficiency and lower transmission delay.

Optionally, the communication system based on the Internet of Vehicles system may be a global system of mobile communication (GSM) system, a code division multiple access (CDMA) system, a wideband code division multiple access (WCDMA) system, a general packet radio service (GPRS), an LTE system, an LTE frequency division duplex (FDD) system, an LTE time division duplex (TDD), a universal mobile telecommunication system (UMTS), a worldwide interoperability for microwave access (WiMAX) communication system, a 5G new radio (NR) system, and the like.

The network devices in the embodiments of the application may be a base transceiver station (BTS) in a GSM system or a CDMA system, it can also be a Node B (NB) in a WCDMA system and can also be an evolutional Node B (eNB or eNodeB) in an LTE system, or a wireless controller in a cloud radio access network (CRAN). Alternatively, the network devices can be network devices, such as a mobile switching center, a relay station, an access point, a vehicle-mounted device, a wearable device, a hub, a switch, a bridge, a router, a network-side device (gNB) in an NR network, a network device in a public land mobile network (PLMN) that evolves in the future, or the like.

The terminal devices in the embodiments of the application may be a terminal device capable of implementing D2D communication. For example, the terminal devices may be a terminal device, such as a vehicle-mounted terminal device, a terminal device (LTE UE) in an LTE system, a terminal device (NR UE) in an NR network, a terminal device in a public land mobile communication network (PLMN) that evolves in the future, or the like which is not limited in the embodiments of the application.

D2D communication technology can be applied to vehicle to vehicle ("V2V") communication or vehicle to everything (V2X) communication. In the V2X communication, X can generally refer to any device with wireless reception and transmission capabilities, such as but not limited to slow-moving wireless devices, fast-moving vehicle-mounted devices, or network control nodes with wireless transmission and reception capabilities. It should be understood that the embodiments of the invention may be mainly applied to a V2X communication scenario or may also be applied to any other D2D communication scenarios, which is not limited in the embodiments of the application.

FIG. 1 is a schematic view of an application scenario provided by an embodiment of the application. FIG. 1 exemplarily illustrates one network device 110 and two terminal devices 121 and 122. Optionally, the wireless communication system in the embodiment of the application may include multiple network devices, and the coverage of each network device may include terminal devices in a different quantity, which is not limited in the embodiment of the application.

It should be understood that the terms "system" and "network" are often used interchangeably herein. The term "and/or" herein is only an association relationship to describe associated objects, indicating that there can be three kinds of relationships. For example, being on A and/or B may mean three situations: A is present alone, both A and B are present, or B is present alone. In addition, the punctuation mark "/" herein generally indicates an "or" relationship between the antecedent object and the succeeding object connected by the mark.

Optionally, the wireless communication system may further include some other network entities, such as a mobile management entity (MME), a serving gateway (S-GW), a packet data network gateway (P-GW), and the like. Alternatively, the wireless communication system may further include some other network entities, such as a session management function (SMF), a unified data management (UDM), an authentication server function (AUSF), and the like, which is not limited by the embodiments of the application.

In the Internet of Vehicles system, the terminal devices communicate in mode A and mode B.

Specifically, a terminal device 121 and a terminal device 122 can communicate in a D2D communication mode. When communicating in the D2D mode, the terminal device 121 and the terminal device 122 communicate directly through a D2D link, that is, a sidelink (SL). In mode A, the transmission resources of the terminal devices 121 and 122 are allocated by the base station (i.e., the network device 110), and the terminal devices 121 and 122 can send data on the SL according to the resources allocated by the base station. The base station can allocate resources for a single transmission to the terminal devices 121 and 122 and can also allocate resources for semi-static transmission to the terminal devices 121 and 122. In mode B, the terminal devices 121 and 122 autonomously select transmission resources on the SL resources. Specifically, the terminal devices 121 and 122 acquire available transmission resources in the resource pool by detecting, or the terminal devices 121 and 122 randomly select a transmission resource from the resource pool.

It should be understood that the mode A and mode B are two illustrative transmission modes, and other transmission modes may be defined. For example, mode 1 and mode 2 may be introduced in NR-V2X, where mode 1 indicates that the sidelink transmission resources of the terminal device are allocated by the base station. The base station can use the mode A and the mode 1 to allocate the sidelink transmission resources in different ways. For example, one may use dynamic scheduling, the other may use semi-static scheduling, semi-static plus dynamic scheduling, or the like. Mode 2 indicates that the sidelink transmission resources of the terminal devices are selected by the terminal.

Figure 2:
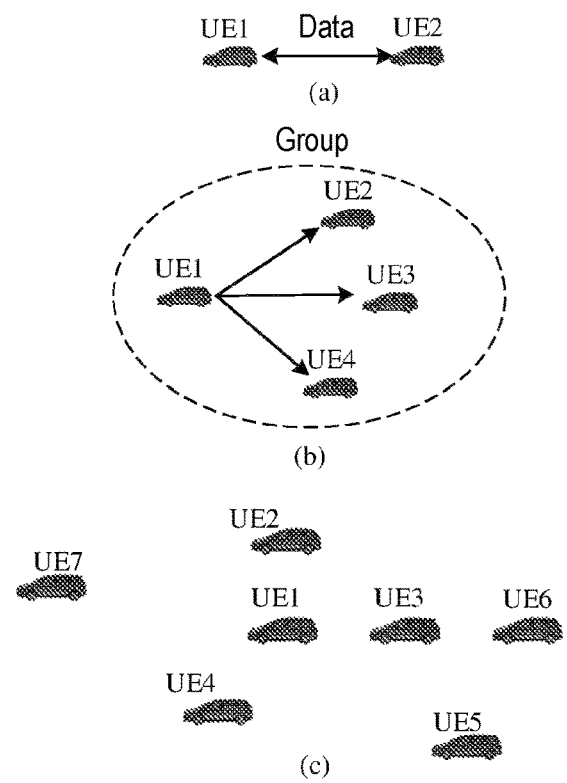
FIG. 2 is a schematic view of several communication modes between terminal devices.

The vehicle to everything (V2X) system (referred to as NR-V2X) based on the new radio (NR) (hereinafter referred to as NR-V2X) can support multiple transmission modes: a unicast transmission mode, a multicast transmission mode, and a broadcast transmission mode. In the unicast transmission mode, the receiving terminal has only one terminal, as the unicast transmission between UE1 and UE2 shown in part (A) of FIG. 2. In the multicast transmission mode, the receiving terminal is a collection of the terminals in a communication group or a collection of the terminals within a certain transmission distance, and as shown in part (B) of FIG. 2, UE1, UE2, UE3, and UE4 form a communication group, and when UE1 sends data, all other terminal devices in the communication group are receiving terminals. In the broadcast transmission mode, the receiving terminal can be any terminal as shown in part (C) of FIG. 2, and UE1 is a transmitting terminal, and other terminals around the UE1 can be receiving terminals.

In the NR-V2X system, to improve transmission reliability, a sidelink feedback channel, such as a physical sidelink feedback channel (PSFCH), is introduced. For the unicast transmission, the transmitting terminal sends sidelink data (including PSCCH and PSSCH) to the receiving terminal, the receiving terminal can send the hybrid automatic repeat request (HARQ) sidelink feedback information to the transmitting terminal, the transmitting terminal can determine whether retransmission is required according to the sidelink feedback information of the receiving terminal, and the HARQ sidelink feedback information may be carried in the sidelink feedback channel.

Figure 3:
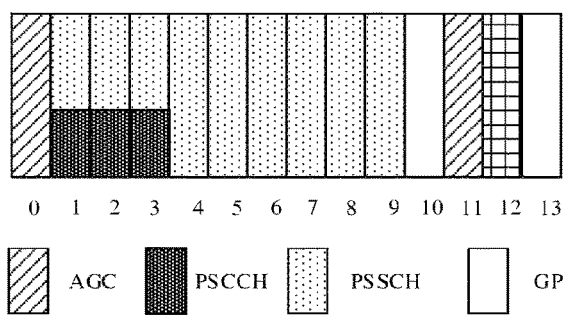
FIG. 3 is a schematic view illustrating a structure of a PSFCH carrying 1-bit feedback information.

The PSFCH only carries 1-bit sidelink feedback information, occupying two time-domain symbols in the time domain, and the two time-domain symbols carry the same sidelink feedback information. The data on one time-domain symbol is a repetition of the data on another time-domain symbol. For example, the second time-domain symbol is used to carry the sidelink feedback information, the data on the first symbol is a duplication of the data on the second symbol, the first symbol is used as automatic gain control (AGC), and the PSFCH frequency domain occupies one physical resource block (PRB). FIG. 3 illustrates the structure of the PSFCH and the physical sidelink shared channel (PSSCH)/the physical sidelink control channel (PSCCH). Specifically, FIG. 3 illustrates the positions of time-domain symbols occupied by PSFCH, PSCCH, and PSSCH in a time slot. In the time slot, the last symbol (i.e., time-domain symbol 13) can be used as a guard period (GP), the second-to-last symbol (time-domain symbol 12) is used for PSFCH transmission, the data on the third-to-last symbol is the same as the data on the second-to-last symbol and used as AGC, and the fourth-to-last symbol is also used as GP. The first symbol in the time slot is used as AGC, and the data on the first symbol is the same as the data on the second symbol in the time slot. PSCCH occupies 3 time-domain symbols, i.e., time-domain symbols 1, 2 and 3. Time-domain symbols 1 to 9 are used to transmit PSSCH. On the time-domain symbols 1, 2, and 3, PSCCH and PSSCH occupy different frequency domain resources.

It should be understood that the quantity and the positions of the time-domain symbols occupied by the PSCCH and the positions of the time-domain symbols occupied by the PSFCH in FIG. 3 are only illustrative examples, and the embodiments of the application are not limited thereto.

Furthermore, to reduce the overhead of PSFCH, one time slot in every N time slot is defined to include PSFCH transmission resources. For example, N=1, 2, 4, the N may be pre-configured or configured by a network device, and FIG. 4 is a schematic view of N=4. For the PSSCH transmitted in the time slots 2, 3, 4, and 5, the corresponding sidelink feedback information is transmitted in the time slot 7, so the time slot {2, 3, 4, 5} can be regarded as a time slot set, and for the PSSCH transmitted in the time slot set, the corresponding PSFCH can be transmitted in the same time slot.

In the NR-V2X system, considering that multi-carrier sidelink transmission is introduced, for example, multiple carriers can transmit different sidelink data, which can improve the throughput of the system, or multiple carriers can transmit the same sidelink data, which can improve the reliability of data, and then in this case, how to perform sidelink feedback is an urgent problem to be solved.

FIG. 5 is a flowchart illustrating a wireless communication method 200 provided by an embodiment of the application. The wireless communication method 200 may be executed by a terminal device 121 or 122 in the communication system shown in FIG. 1, and as shown in FIG. 5, the wireless communication method 200 may include at least some of the following contents.

In S210, the first terminal receives N sidelink data channels sent by the second terminal on the N frequency domain resources. The N frequency domain resources correspond one-to-one to the N sidelink data channels, N is an integer greater than 1, and the frequency domain resources are carriers or bandwidth parts (BWPs).

In S220, the first terminal sends the sidelink feedback information of the N sidelink data channels to the second terminal on M frequency domain resources, where M is a positive integer, and M≤N.

It should be understood that the embodiments of the application are also applicable to sidelink transmission on multiple frequency domain resources and other scenarios where sidelink feedback is required to be performed. For example, the first terminal may also receive N sidelink reference signals on the N frequency domain resources and further send measurement results of the N sidelink reference signals to the second terminal on the M frequency domain resources. In the subsequent paragraphs, the sidelink feedback on the sidelink data channel is illustrated as an example, but the embodiments of the application are not limited thereto.

Optionally, the sidelink reference signal in the embodiment of the application may include, for example, a sidelink synchronization signal (SLSS), a sidelink synchronization signal block (S-SSB), a sidelink channel state information reference signal (SL CSI-RS), a demodulation reference signal (DMRS), and the S-SSB may include a sidelink primary synchronization signal (S-PSS), a sidelink secondary synchronization signal (S-SSS), and the like. The demodulation reference signals include PSSCH-DMRS, PSCCH DMRS, and PSBCH DMRS.

In the embodiments of the application, the N frequency domain resources may be N carriers or N bandwidth parts (BWPs) or can be other frequency domain units. Similarly, the M frequency domain resources may be M carriers or M BWPs or can be other frequency domain units. In the subsequent paragraphs, an example of which the N frequency domain resources are N carriers, and the M frequency domain units are M carriers is illustrated, but the embodiment of the application is not limited thereto.

It should be understood that the embodiments of the application do not limit the relationship between the M carriers and the N carriers. For example, the M carriers may be M out of the N carriers, or the N carriers may correspond to K carriers. The K carriers are at least partially different from the N carriers, and the M carriers are M out of the K carriers, where K≥M.

It should also be understood that the embodiments of the application do not limit the quantity of the M carriers.

In an example, the quantity of the M carriers is equal to the quantity of the N carriers, that is, M=N. For example, the M carriers are the N carriers.

In another example, the quantity of the M carriers is less than the quantity of the N carriers. For example, the M carriers are M out of the N carriers, and in some specific examples, the M=1, or M>1 and M<N.

The first terminal may receive a sidelink data channel, such as PSSCH, sent by the second terminal on the N carriers. Furthermore, the first terminal may send the sidelink feedback information of the PSSCH received on the N carriers to the second terminal on the M carriers. That is, the first terminal can feed back the sidelink feedback information of N PSSCHs, so that the second terminal can determine whether to perform PSSCH retransmission according to the sidelink feedback information of the N PSSCHs.

Optionally, in some embodiments, M is 1, and the first terminal may send a sidelink feedback channel, such as a physical sidelink feedback channel (PSFCH), on one carrier. The one sidelink feedback channel carries the sidelink feedback information of the N PSSCHs.

Optionally, in other embodiments, M is greater than 1, and the first terminal may send a sidelink feedback channel, such as PSFCH, on each of the M carriers. Each sidelink feedback channel carries the sidelink feedback information of the N PSSCHs. That is, the first terminal can send the sidelink feedback channel to the second terminal through multiple carriers, so that the reliability of the PSFCH can be improved.

It should be understood that the embodiments of the application do not specifically limit the quantity of bits occupied by the sidelink feedback information corresponding to the sidelink data channel. In a specific example, the sidelink feedback information corresponding to each sidelink data channel may be ACK or NACK, that is, occupying 1 bit. In the subsequent paragraphs, an example of which the sidelink feedback information corresponding to the sidelink data channel is 1-bit feedback information is illustrated, but the embodiments of the application are not limited thereto.

Optionally, in some embodiments, the same data is transmitted in the N PSSCHs. That is, the second terminal may perform data transmission in a duplication manner.

In this case, in some embodiments, the sidelink feedback information of the N PSSCHs may be one piece of sidelink feedback information corresponding to the same data. That is, the N PSSCHs may correspond to one piece of sidelink feedback information. When one PSSCH transmits one transport block (TB), one piece of sidelink feedback information corresponding to the N PSSCHs is 1 bit. If one PSSCH transmits 2 TBs, each TB corresponds to 1-bit sidelink feedback information, and one piece of sidelink feedback information corresponding to the N PSSCHs is 2 bits. Alternatively, for the feedback mode based on code block group (CBG), one CBG corresponds to 1-bit sidelink feedback information, and the quantity of bits of one piece of sidelink feedback information corresponding to the N PSSCHs is the quantity of CBGs.

Optionally, the one piece of sidelink feedback information may be determined according to the decoding result of the combined decoding of the N PSSCHs. Alternatively, in other embodiments, the sidelink feedback information of the N PSSCHs may also include sidelink feedback information corresponding to each PSSCH in the N PSSCHs, and the sidelink feedback information corresponding to each PSSCH may be determined according to the decoding result of each PSSCH.

For example, the N carriers include a carrier 0 and a carrier 1, and the first terminal may receive PSSCH1 on the carrier 0 and PSSCH2 on the carrier 1. The same data is transmitted in the PSSCH1 and PSSCH2, such as TB1. Optionally, different redundant versions of the data are transmitted on the carrier 0 and the carrier 1.

In an example, the first terminal may perform a combining processing on the data carried on the PSSCH1 and PSSCH2, and for example, the combined decoding is performed. If the decoding is successful, ACK is fed back; otherwise, NACK is fed back. Since the same data is transmitted on the two carriers, only one piece of sidelink feedback information is required to be transmitted, that is, only 1 bit is required.

Figure 7:
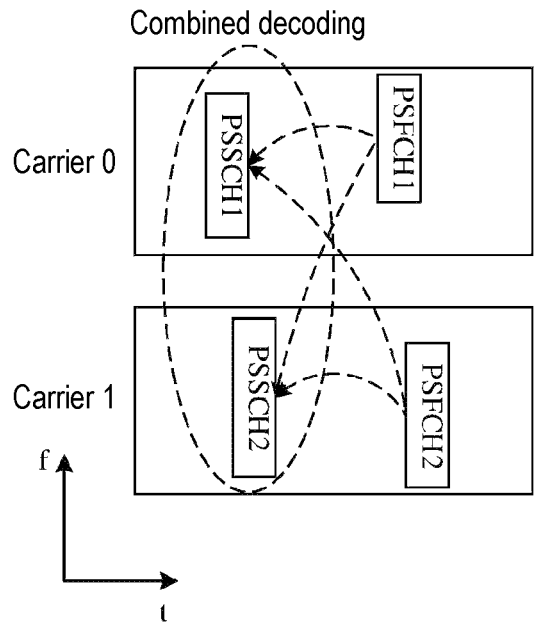

Furthermore, as shown in FIG. 6, the first terminal may transmit the one piece of sidelink feedback information for the PSSCH1 and PSSCH2 on carrier 0. Alternatively, the first terminal may transmit the one piece of sidelink feedback information for the PSSCH1 and PSSCH2 on carrier 1 or may also transmit the one piece of sidelink feedback information on both carriers as shown in FIG. 7, and the reliability of sidelink feedback can be improved.

In another example, the first terminal may process the data carried on the PSSCH1 and PSSCH2, respectively. For example, decoding is performed respectively, and the corresponding sidelink feedback information is determined according to the respective decoding results.

Figure 8:
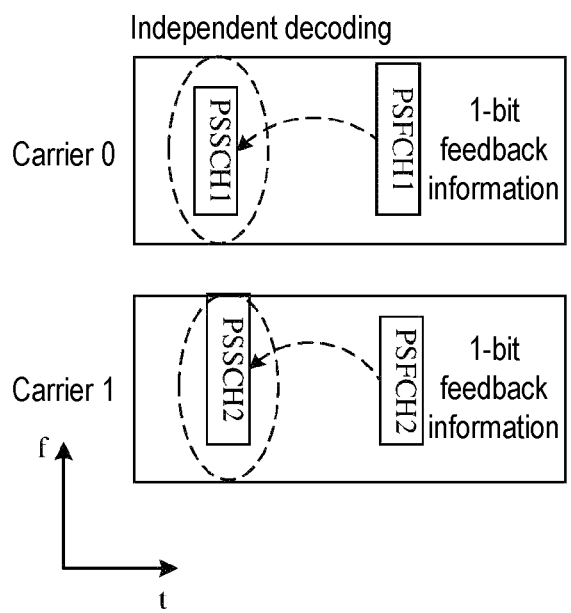

Furthermore, the first terminal can individually feedback each data. For example, as shown in FIG. 8, the first sidelink feedback channel is sent on the carrier 0, the first sidelink feedback channel includes the sidelink feedback information of PSSCH1, the second sidelink feedback channel is sent on the carrier 1, and the second sidelink feedback channel includes the sidelink feedback information of PSSCH2. That is, each sidelink feedback channel includes 1-bit feedback information. Alternatively, in other embodiments, the first terminal may perform combined feedback on each data. For example, the first terminal may send a sidelink feedback channel on the carrier 0 and/or the carrier 1, and the sidelink feedback channel may include sidelink feedback information corresponding to the PSSCH1 and PSSCH2, respectively. That is, the sidelink feedback channel may include 2-bit feedback information. Since PSSCH1 and PSSCH2 carry the same data, namely TB1, for the receiving terminal, if at least one bit in the 2-bit sidelink feedback information is ACK, it can be considered that the TB1 is correctly received.

Optionally, in other embodiments, different data is transmitted in the N PSSCHs transmit. That is, the second terminal may perform data transmission in a multiplexing manner.

In the case, the sidelink feedback information of the N PSSCHs may include sidelink feedback information corresponding to each of the different data, and the sidelink feedback information corresponding to each data may be determined according to the decoding result of each PSSCH.

Furthermore, the first terminal may perform combined feedback on the N PSSCHs. For example, the sidelink feedback information of each PSSCH in the N PSSCHs may be sent through each of the M carriers. That is, one sidelink feedback channel is transmitted on each carrier, and the sidelink feedback channel is used to carry N pieces of sidelink feedback information corresponding to the N PSSCHs. That is, the sidelink feedback channel transmitted on each carrier carries N-bit sidelink feedback information. Alternatively, in other embodiments, the first terminal may also feed back the N PSSCHs individually. For example, the sidelink feedback information corresponding to each PSSCH may be transmitted through a carrier corresponding to each PSSCH.

For example, the N carriers include the carrier 0 and the carrier 1, the first terminal can receive PSSCH1 on the carrier 0 and PSSCH2 on the carrier 1, and different data is transmitted in PSSCH1 and PSSCH2. For example, PSSCH1 carries TB1, and PSSCH2 carries TB2.

The first terminal may process the data carried on the PSSCH1 and PSSCH2, respectively. For example, decoding is performed respectively, and the corresponding sidelink feedback information is determined according to the respective decoding results. For example, if the detection of PSSCH1 is successful, ACK is fed back; otherwise, NACK is fed back, which is similar for PSSCH2. Since different data is transmitted in PSSCH1 and PSSCH2, sidelink feedback information for each data is required to be fed back, that is, 2-bit sidelink feedback information is required.

Figure 9:
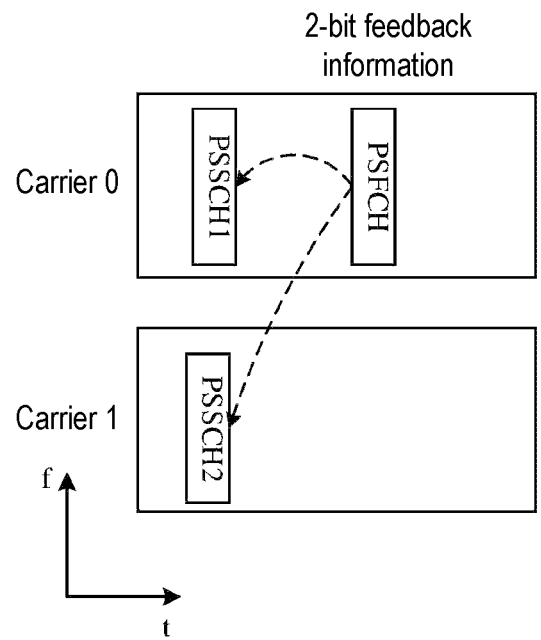
Figure 10:
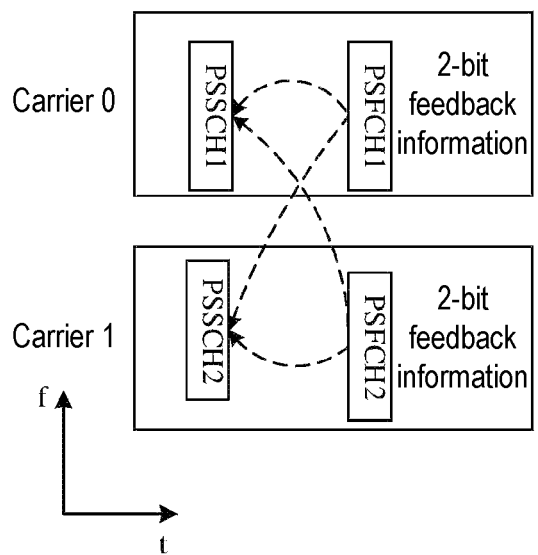

Furthermore, the first terminal may perform combined feedback on each data. For example, as shown in FIG. 9, the first terminal may send a sidelink feedback channel on the carrier 0, and the sidelink feedback channel may include sidelink feedback information corresponding to the PSSCH1 and PSSCH2, respectively. That is, the sidelink feedback channel may include 2-bit feedback information, or the sidelink feedback channel may also be sent on the carrier 1. Alternatively, as shown in FIG. 10, the first terminal may also send the sidelink feedback channel on both the carrier 0 and the carrier 1, and each sidelink feedback channel includes 2-bit sidelink feedback information, which contributes to improving the reliability of the sidelink feedback channel.

In other embodiments, the first terminal may also feed back each data individually. For example, as shown in FIG. 8, the first sidelink feedback channel is sent on the carrier 0, the first sidelink feedback channel includes the sidelink feedback information of PSSCH1, the second sidelink feedback channel is sent on carrier 1, and the first sidelink feedback channel includes the sidelink feedback information of PSSCH2, that is, each sidelink feedback channel includes 1-bit feedback information.

It should be understood that in the embodiments of the application, when the feedback information of the N PSSCHs is combined into a sidelink feedback channel for transmission, the sidelink feedback channel carries one or more bits of feedback information. The sidelink feedback channel with multiple bits of feedback information is denoted as the second type of sidelink feedback channel, which is different from the channel design of the PSFCH carrying 1-bit sidelink feedback information shown in FIG. 3.

Optionally, in some embodiments, in the time domain, the second type of sidelink feedback channel occupies all time-domain symbols in a time slot that can be used for sidelink transmission.

Optionally, the last time-domain symbol among all time-domain symbols that can be used for sidelink transmission in a time slot is not used for transmitting the second type of sidelink feedback channel. For example, the last time-domain symbol is used as a GP.

Optionally, the first time-domain symbol among all time-domain symbols that can be used for sidelink transmission in a time slot is used as an AGC.

Optionally, the data on the first time-domain symbol among all the time-domain symbols that can be used for sidelink transmission in a time slot is the reproduction or duplication of the data on the second time-domain symbol used for sidelink transmission in the time slot. That is, the data on the first time-domain symbol and the second time-domain symbol that can be used for sidelink transmission is the same.

Optionally, in the frequency domain, the second type of sidelink feedback channel occupies M PRBs, where M is a positive integer. That is, the second type of sidelink feedback channel may occupy one or more PRBs in the frequency domain.

Therefore, in some implementations, the second type of sidelink feedback channel may occupy all time-domain symbols that can be used for sidelink transmission in a time slot in the time domain and occupy one or more RPBs in the frequency domain.

In other alternative implementations, the second type of sidelink feedback channel may occupy the second-to-last time domain symbol and the third-to-last time domain symbol among all time-domain symbols that can be used for sidelink transmission in a time slot in the time domain and occupy P PRBs in the frequency domain, where the P is an integer greater than 1. That is, the transmission of multi-bit feedback information can be implemented by occupying multiple PRBs in the frequency domain.

In the embodiments of the application, if the first terminal transmits the feedback information of the N PSSCHs on some of the N carriers, the first terminal is also required to perform carrier selection to determine M carriers out of the N carriers, where M is less than N.

Optionally, in some embodiments of the application, according to the channel busy rate (CBR) of the carrier, the measurement result of the sidelink data channel, the carrier index of the N carriers, the reception time of the N sidelink data channels, and at least one piece of the first information, the first terminal may determine the M carriers. The first information may be used to indicate a target carrier for transmitting sidelink feedback information.

In the subsequent paragraphs, specific embodiments are illustrated.

Embodiment 1: Carrier Selection is Performed According to the CBR of the Carrier In an example, the first terminal may measure the CBR on the resource pool of the N carriers and perform carrier selection according to the CBR of the resource pool of the N carriers. For example, the first terminal may determine the M carriers with the lowest CBRs as a target carrier for transmitting feedback information. It can be understood that the lower the CBR, the lower the congestion degree of the system, that is, the lower the probability of interference between users. The selection of a carrier with a low CBR to transmit the PSFCH contributes to improving the detection performance of the PSFCH.

Optionally, the resource pool may be, for example, the resource pool used by the PSSCH sent by the second terminal, the resource pool used by the first terminal to send the PSFCH, or any resource pool on the carrier.

Optionally, since multiple BWPs are usually configured on the carrier, and there are activated BWPs in the multiple BWPs, the resource pool of the N carriers may specifically be the resource pool of the BWPs activated on the N carriers.

Embodiment 2: Carrier Selection is Performed According to Measurement Results Optionally, the measurement result may be a measurement result of the reference signal receiving power (RSRP) of the sidelink data channel, may also be the measurement result of the sidelink control channel corresponding to the sidelink data channel, or may also be the measurement results of other parameters, such as the reference signal receiving quality (RSRQ), the signal to interference plus noise ratio (SL-SINR), and the like, which is not limited by the embodiments of the application.

In an example, the second terminal may send N PSSCHs, and the first terminal may measure the RSRP corresponding to the N PSSCHs or the RSRP of the PSCCH corresponding to the PSSCH. Furthermore, the M carriers with the highest measured RSRP on the N carriers may be selected as target carriers for sidelink feedback. It can be understood that the higher the RSRP, the higher the detection performance of the PSSCH on the carrier, and accordingly the higher the detection performance of the PSFCH transmitted through the carrier.

Embodiment 3: Carrier Selection is Performed According to the Transmission Time or Reception Time of PSSCH The PSSCHs received by the first terminal on the N carriers correspond to different transmission time. If the feedback information corresponding to each PSSCH is required to be multiplexed on one PSFCH, then it is necessary to select the carrier where the PSSCH sent at the latest (i.e., received at the latest) is located, which contributes to ensuring that the first terminal has sufficient processing time.

For example, the N carriers include the carrier 0 and the carrier 1, the first terminal receives PSSCH1 on the carrier 0 and PSSCH2 on the carrier 1, and the transmission time of the PSSCH1 and PSSCH2 is different. The transmission time of PSSCH2 is later than the transmission time of the PSSCH1. As shown in part (A) of FIG. 11, if the first terminal selects the carrier 0 to transmit PSFCH1, since the time interval between PSFCH1 and PSSCH2 is relatively short, the first terminal may not have enough processing time to decode PSSCH2 and multiplex the detection results to PSFCH1 for feedback. PSFCH2 on the carrier 1 is used for feedback, as shown in part (B) of FIG. 11, and the intervals between PSFCH2 and PSSCH1 and PSSCH2 are long, so this contributes to ensuring that the first terminal has enough processing time to decode both PSSCH1 and PSSCH2 and multiplex the detection results into PSFCH2 for transmission. Moreover, if the second terminal acquires the transmission time of the PSSCH, the second terminal only needs to detect the PSFCH on the carrier corresponding to the PSSCH with the latest transmission time without blindly detecting the PSFCH, which contributes to improving the system performance.

Embodiment 4: Carrier Selection is Performed According to a Carrier Index

In the embodiment, the first terminal may select a carrier with a specific carrier index as the target carrier for sidelink feedback. For example, the first terminal may select M carriers with the smallest indices (or the largest indices) among the N carriers as the target carriers.

For both the first terminal and the second terminal, the indices of the N carriers can be acquired, and the second terminal can receive the PSFCH in the M carriers with the smallest indices without blindly detecting the PSFCH in the N carriers.

Embodiment 5: Carrier Selection is Performed According to the First Information In an example, the first terminal may determine that the carrier indicated by the first information is the target carrier for sidelink feedback.

Embodiment 5-1: The First Information is Sent by the Second Terminal to the First Terminal The second terminal indicates a target carrier for transmitting feedback information through the first information, so that blindly detecting the PSFCH by the second terminal on the N carriers can be prevented.

Optionally, the second terminal may carry the first information in the N PSSCHs. Alternatively, the first information may also be sent by the second terminal through sidelink control information (SCI) or through a PC5-RRC signaling. For example, when the first terminal and the second terminal establish a connection, the two may exchange configuration information through PC5-RRC signaling, and the first information may be carried in the configuration information.

Optionally, the second terminal may also update the target carrier. For example, the target carrier may be updated by reconfiguring the PC5-RRC signaling or the SCI.

Embodiment 5-2: The First Information is Sent by a Network Device to the First Terminal By configuring the target carrier for transmitting the PSFCH, the network device can implement the equalization of the PSFCH transmission resources on each carrier.

Optionally, the network device may configure the target carrier through a message or a signaling, such as a broadcast message or radio resource control (RRC) signaling.

Optionally, the network device may also update the target carrier, such as updating the target carrier through downlink control information (DCI).

Embodiment 5-3: The First Information is Sent by the Group Head Terminal to the First Terminal The group head terminal indicates the target carrier for sidelink feedback through the first information, so that the transmission resources of the PSFCH in the communication group can be coordinated.

The group head terminal may refer to a terminal with functions, such as resource management, resource allocation, resource scheduling, resource coordination, and the like in the communication group of multicast communication. For example, the first vehicle runs in a fleet or the vehicle runs in the middle of a fleet. The group head terminal may configure the resource pool configuration used for sending the PSFCH when communicating within the communication group.

Optionally, the group head terminal can be sent through the SCI or also through a broadcast message in the group. For example, the group head terminal can configure the carrier used for sending the PSFCH when configuring the data communication in the communication group.

Optionally, the group head terminal may also update the target carrier. For example, the target carrier may be updated through a broadcast message within the group.

Optionally, in other alternative embodiments, the first terminal may also determine that the primary carrier in the N carriers is the target carrier; or if the N frequency domain resources are N BWPs, the first terminal may also determine that the BWP corresponding to the primary carrier is the target BWP used for sidelink transmission.

Therefore, in the embodiments of the application, the first terminal may receive PSSCH on multiple carriers and may further combine feedback information corresponding to multiple PSSCHs in one PSFCH for feedback, which contributes to reducing the overhead of sidelink feedback.

Furthermore, when the first terminal performs sidelink feedback, the carrier selection can be performed, and a specific carrier is used to transmit the PSFCH, such as a carrier with a low CBR, a carrier with the latest transmission time, a carrier with the smallest index, or a primary carrier, and the like, which contributes to improving the detection performance of PSFCH.

FIG. 12 is a flowchart illustrating a wireless communication method 300 according to another embodiment of the application. The wireless communication method 300 may be executed by a terminal device 210 or 220 in the communication system shown in FIG. 1, and as shown in FIG. 12, the wireless communication method 300 includes the following contents.

In S310, the first terminal receives N sidelink data channels sent by the second terminal on the N frequency domain resources. The N frequency domain resources correspond one-to-one to the N sidelink data channels, N is an integer greater than 1, and the frequency domain resources are carriers or bandwidth parts (BWPs).

In S320, the first terminal determines M frequency domain resources among the N frequency domain resources, where M is a positive integer, and M<N.

In S330, the first terminal sends the sidelink feedback information of the N sidelink data channels to the second terminal on M frequency domain resources.

Specifically, for the specific implementation of the wireless communication method 300, refer to the related implementation of the carrier selection in the wireless communication method 200, which is not repeated herein for conciseness.

Optionally, in some embodiments, when the first terminal determines M frequency domain resources among the N frequency domain resources, steps as follows are included.

The M frequency domain resources among the N frequency domain resources are determined according to at least one of the channel busy rate (CBR) of the resource pool on the N frequency domain resources, the measurement results of the sidelink data channels on the N frequency domain resources, the transmission time of the N sidelink data channels, the indices of the N frequency domain resources, and the first information. The first information is used to indicate a target frequency domain resource used for transmitting sidelink feedback information.

Optionally, in some embodiments, the step in which the M frequency domain resources among the N frequency domain resources are determined according to at least one of the channel busy rate (CBR) of the resource pool on the N frequency domain resources, the measurement results of the sidelink data channels on the N frequency domain resources, the transmission time of the N sidelink data channels, the indices of the N frequency domain resources, and the first information includes the following:

determining that the M frequency domain resources include M frequency domain resources with the lowest CBRs among the N frequency domain resources; or determining that the M frequency domain resources include the M frequency domain resources with the highest measured RSRP on the N frequency domain resources if the measurement result is the measurement result of the RSRP of the sidelink data channel; or determining that the M frequency domain resources include a frequency domain resource corresponding to a sidelink data channel with the latest transmission time among the N sidelink data channels; or determining that the M frequency domain resources include M frequency domain resources with the smallest indices among the N frequency domain resources; or determining that the M frequency domain resources include a frequency domain resource indicated by the first information; or determining that the M frequency domain resources include a primary carrier among the N frequency domain resources if the frequency domain resource is a carrier; or determining that the M frequency domain resources include the BWP corresponding to the primary carrier if the frequency domain resource is BWP.

Optionally, in some embodiments, the first information is sent by the second terminal to the first terminal.

Alternatively, the first information is sent by the network device to the first terminal.

Alternatively, the first information is sent by the group head terminal to the first terminal.

Optionally, in some embodiments, the second terminal sends the first information to the first terminal through sidelink control information (SCI) or a PC5-RRC signaling.

The network device sends the first information through a broadcast message or a radio resource control (RRC) signaling.

The group head terminal sends the first information to the first terminal through the SCI or the PC5-RRC signaling.

Optionally, in some embodiments, when the first terminal sends the sidelink feedback information of the N sidelink data channels to the second terminal on the M frequency domain resources, steps as follows are included.

The first terminal sends a sidelink feedback channel on each of the M frequency domain resources, and each sidelink feedback channel carries the sidelink feedback information of the N sidelink data channels.

Optionally, in some embodiments, if the same data is transmitted in the N sidelink data channels, the sidelink feedback information of the N sidelink data channels is sidelink feedback information corresponding to the same data.

Alternatively, if different data is transmitted the N sidelink data channels, the sidelink feedback information of the N sidelink data channels includes sidelink feedback information corresponding to each of the different data.

Optionally, in some embodiments, if the same data is transmitted in the N sidelink data channels, the sidelink feedback information corresponding to the same data is determined according to the combined decoding of the N sidelink data channels.

The method embodiments of the application are illustrated in detail with reference to FIG. 5 to FIG. 12 in the foregoing paragraphs, and the device embodiments of the application are illustrated in detail with reference to FIG. 13 to FIG. 16 in the subsequent paragraphs. It should be understood that the device embodiments and the method embodiments correspond to each other, and for similar illustration, refer to those illustrated in the method embodiments.

FIG. 13 is a schematic block diagram of a terminal device 400 according to an embodiment of the application. As shown in FIG. 13, the terminal device 400 includes the following.

A communication module 410 is configured to receive N sidelink data channels sent by the second terminal on the N frequency domain resources, and the N frequency domain resources correspond one-to-one to the N sidelink data channels, where N is an integer greater than 1, and the frequency domain resources are carriers or bandwidth parts (BWPs).

A determining module 420 is configured to send the sidelink feedback information of the N sidelink data channels to the second terminal on the M frequency domain resources, where M is a positive integer, and M≤N.

Optionally, in some embodiments of the application, the communication module 410 is further configured to perform the following.

The terminal device sends a sidelink feedback channel on each of the M frequency domain resources, and each sidelink feedback channel carries the sidelink feedback information of the N sidelink data channels.

Optionally, in some embodiments of the application, if the same data is transmitted in the N sidelink data channels, the sidelink feedback information of the N sidelink data channels is one piece of sidelink feedback information corresponding to the same data. Alternatively, if different data is transmitted in the N sidelink data channels, the sidelink feedback information of the N sidelink data channels includes sidelink feedback information corresponding to each of the different data.

In some embodiments, if the same data is transmitted in the N sidelink data channels, the sidelink feedback information corresponding to the same data is determined according to the combined decoding result of the N sidelink data channels.

Optionally, in some embodiments of the application, the determining module 420 is further configured to perform the following.

The M frequency domain resources among the N frequency domain resources are determined, where M<N.

Optionally, in some embodiments of the application, the determining module 420 is specifically configured to perform the following.

The M frequency domain resources among the N frequency domain resources are determined according to at least one of the channel busy rate (CBR) of the resource pool on the N frequency domain resources, the measurement results of the sidelink data channels on the N frequency domain resources, the transmission time of the N sidelink data channels, the indices of the N frequency domain resources, and the first information. The first information is used to indicate a target frequency domain resource used for transmitting sidelink feedback information.

Optionally, in some embodiments of the application, the determining module 420 is specifically configured to perform the following:

determining that the M frequency domain resources include M frequency domain resources with the lowest CBRs among the N frequency domain resources; or determining that the M frequency domain resources include the M frequency domain resources with the highest measured RSRP on the N frequency domain resources if the measurement result is the measurement result of the RSRP of the sidelink data channel; or determining that the M frequency domain resources include a frequency domain resource corresponding to a sidelink data channel with the latest transmission time among the N sidelink data channels; or determining that the M frequency domain resources include M frequency domain resources with the smallest indices among the N frequency domain resources; or determining that the M frequency domain resources include a frequency domain resource indicated by the first information; or determining that the M frequency domain resources include a primary carrier among the N frequency domain resources if the frequency domain resource is a carrier; or determining that the M frequency domain resources include the BWP corresponding to the primary carrier if the frequency domain resource is BWP.

Optionally, the first information is sent by the second terminal to the terminal device.

Alternatively, the first information is sent by the network device to the terminal device.

Alternatively, the first information is sent by the group head terminal to the terminal device.

Optionally, in some embodiments of the application, the second terminal sends the first information to the terminal device through sidelink control information (SCI) or a PC5-RRC signaling.

The network device sends the first information through a broadcast message or a radio resource control (RRC) signaling.

The group head terminal sends the first information to the terminal device through the SCI or the PC5-RRC signaling.

Optionally, in some embodiments, the communication module 410 may be a communication interface or a transceiver, or an input/output interface of a communication chip or a system-on-chip. The determining module 420 may be one or more processors.

It should be understood that the terminal device 400 according to the embodiment of the application may correspond to the terminal device in the method embodiment of the application, and the foregoing description of each unit and other operations and/or functions of each unit in the terminal device 400 are for implementing the corresponding process of the first terminal in the forgoing embodiments, respectively, and details are not repeated herein for conciseness.

Figure 14:
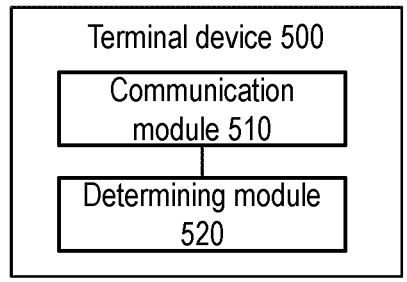
FIG. 14 is a schematic block diagram of another terminal device provided by an embodiment of the application.

FIG. 14 is a schematic block diagram of a terminal device 500 according to an embodiment of the application. As shown in FIG. 14, the terminal device 500 includes the following.

A communication module 510 is configured to receive N sidelink data channels sent by the second terminal on the N frequency domain resources, and the N frequency domain resources correspond one-to-one to the N sidelink data channels, where N is an integer greater than 1, and the frequency domain resources are carriers or bandwidth parts (BWPs).

A determining module 520 is configured to determine M frequency domain resources among the N frequency domain resources, where M is a positive integer, and M<N.

The communication module 510 is further configured to send the sidelink feedback information of the N sidelink data channels to the second terminal on the M frequency domain resources.

Optionally, in some embodiments of the application, the determining module 520 is further configured to perform the following.

The M frequency domain resources among the N frequency domain resources are determined according to at least one of the channel busy rate (CBR) of the resource pool on the N frequency domain resources, the measurement results of the sidelink data channels on the N frequency domain resources, the transmission time of the N sidelink data channels, the indices of the N frequency domain resources, and the first information. The first information is used to indicate a target frequency domain resource used for transmitting sidelink feedback information.

Optionally, in some embodiments of the application, the determining module 520 is specifically configured to perform the following:

determining that the M frequency domain resources include M frequency domain resources with the lowest CBRs among the N frequency domain resources; or determining that the M frequency domain resources include the M frequency domain resources with the highest measured reference signal receiving power (RSRP) on the N frequency domain resources if the measurement result is the measurement result of the RSRP of the sidelink data channel; or determining that the M frequency domain resources include a frequency domain resource corresponding to a sidelink data channel with the latest transmission time among the N sidelink data channels; or determining that the M frequency domain resources include M frequency domain resources with the smallest indices among the N frequency domain resources; or determining that the M frequency domain resources include a frequency domain resource indicated by the first information; or determining that the M frequency domain resources include a primary carrier among the N frequency domain resources if the frequency domain resource is a carrier; or determining that the M frequency domain resources include the BWP corresponding to the primary carrier if the frequency domain resource is BWP.

Optionally, the first information is sent by the second terminal to the terminal device.

Alternatively, the first information is sent by the network device to the terminal device.

Alternatively, the first information is sent by the group head terminal to the terminal device.

Optionally, in some embodiments of the application, the second terminal sends the first information to the terminal device through sidelink control information (SCI) or a PC5-RRC signaling.

The network device sends the first information through a broadcast message or radio resource control (RRC) signaling.

The group head terminal sends the first information to the terminal device through the SCI or the PC5-RRC signaling.

Optionally, in some embodiments, the communication module 510 may be specifically configured to perform the following:

sending a sidelink feedback channel on each of the M frequency domain resources, and carrying the sidelink feedback information of the N sidelink data channels through each sidelink feedback channel.

Optionally, in some embodiments of the application, if the same data is transmitted in the N sidelink data channels, the sidelink feedback information of the N sidelink data channels is sidelink feedback information corresponding to the same data.

Alternatively, if different data is transmitted in the N sidelink data channels, the sidelink feedback information of the N sidelink data channels includes sidelink feedback information corresponding to each of the different data.

Optionally, in some embodiments of the application, if the same data is transmitted in the N sidelink data channels, the sidelink feedback information corresponding to the same data is determined according to the combined decoding of the N sidelink data channels.

Optionally, in some embodiments, the communication module 510 may be a communication interface or a transceiver, or an input/output interface of a communication chip or a system-on-chip. The determining module 520 may be one or more processors.

It should be understood that the terminal device 500 according to the embodiment of the application may correspond to the terminal device in the method embodiment of the application, and the foregoing description of each unit and other operations and/or functions of each unit in the terminal device 500 are for implementing the corresponding process of the first terminal in the forgoing embodiments, respectively, and details are not repeated herein for conciseness.

Figure 15:
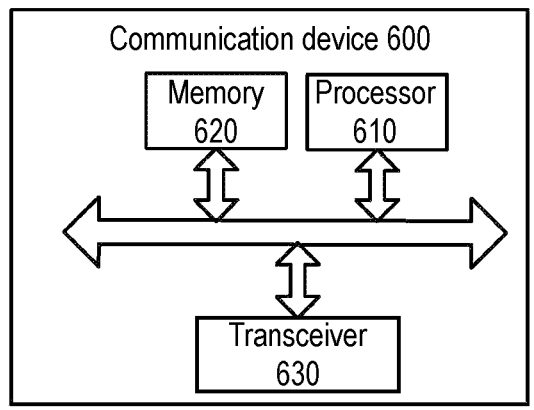
FIG. 15 is a schematic block diagram of a communication device provided by another embodiment of the application.

FIG. 15 is a schematic structural view of a communication device 600 provided by an embodiment of the application. The communication device 600 shown in FIG. 15 includes a processor 610, and the processor 610 can call and run a computer program from a memory to implement the methods in the embodiments of the application.

Optionally, as shown in FIG. 15, the communication device 600 may further include a memory 620. The processor 610 may call and run a computer program from the memory 620 to implement the methods in the embodiments of the application.

The memory 620 may be a separate device independent of the processor 610, or may be integrated in the processor 610.

Optionally, as shown in FIG. 15, the communication device 600 may further include a transceiver 630. The processor 610 may control the transceiver 630 to communicate with other devices and, specifically, may send information or data to other devices or receive information or data sent by other devices.

The transceiver 630 may include a transmitter and a receiver. The transceiver 630 may further include antennas, and the number of the antennas may be one or more.

Optionally, the communication device 600 may specifically be the network device in the embodiments of the application, and the communication device 600 may implement the corresponding process implemented by the network device in each method in the embodiments of the application. For conciseness, details are not repeated herein.

Optionally, the communication device 600 may specifically be the mobile terminal/terminal device of the embodiments of the application, and the communication device 600 may implement the corresponding process implemented by the mobile terminal/terminal device in each method of the embodiments of the application. For conciseness, details are not repeated herein.

Figure 16:
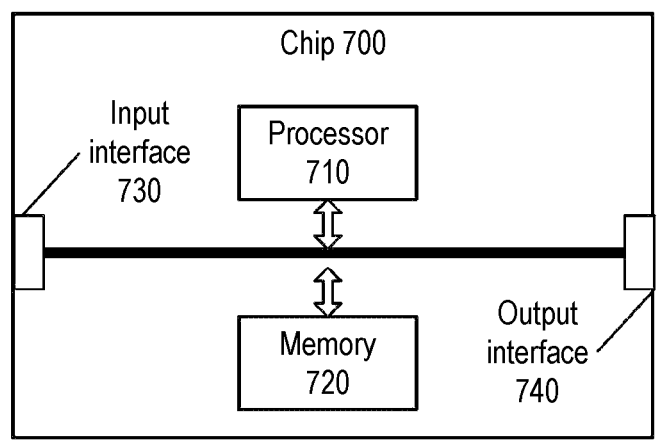
FIG. 16 is a schematic block diagram of a chip provided by an embodiment of the application.

FIG. 16 is a schematic structural view of a chip according to an embodiment of the application. A chip 700 shown in FIG. 16 includes a processor 710, and the processor 710 can call and run a computer program from a memory to implement the methods in the embodiments of the application.

Optionally, as shown in FIG. 16, the chip 700 may further include a memory 720. The processor 710 may call and run a computer program from the memory 720 to implement the methods in the embodiments of the application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 can control the output interface 740 to communicate with other devices or chips, and specifically, can output information or data to other devices or chips.

Optionally, the chip can be applied to the network device in the embodiments of the application, and the chip can implement the corresponding process implemented by the network device in each method of the embodiments of the application. For conciseness, details are not repeated herein.

Optionally, the chip can be applied to the mobile terminal/terminal device in the embodiments of the application, and the chip can implement the corresponding process implemented by the mobile terminal/terminal device in each method of the embodiments of the application. For conciseness, details are not repeated herein.

It should be understood that the chip mentioned in the embodiments of the application may also be referred to as a system-on-a-chip, a SoC, a system on a chip, or a system on chip, or the like.

It should be understood that the processor of the embodiments of the application may be an integrated circuit chip with signal processing capability. In the implementation, the steps of the method embodiments can be completed by hardware integrated logic circuits in the processor or instructions in the form of software. The processor may be a general-purpose processor, a digital signal processor (DSP), an application specific integrated circuit (ASIC), a field programmable gate array (FPGA), other programmable logic devices, discrete gates, transistor logic devices, or discrete hardware components. The processor can implement or execute the methods, steps, and logical block diagrams disclosed in the embodiments of the application. The general-purpose processor may be a microprocessor, or the processor may also be any conventional processor or the like. The steps of the method disclosed in the embodiments of the application may be directly embodied as being executed and completed by a hardware decoding processor or by a combination of hardware and software modules in the decoding processor. The software module can be located in a mature storage medium in the field, such as random access memory, flash memory, read-only memory, programmable read-only memory, electrically erasable programmable memory, or a register. The storage medium is located in the memory, and the processor reads the information in the memory and completes the steps of the method in combination with its hardware.

It can be understood that the memory in the embodiments of the application may be volatile memory or non-volatile memory or may include both volatile and non-volatile memory. The non-volatile memory can be read-only memory (ROM), programmable ROM (PROM), erasable PROM (EPROM), electrically EPROM (EEPROM), or flash memory. The volatile memory may be random access memory (RAM), which is used as an external cache. By an illustration but not restrictive description, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct rambus RAM (DR RAM). Note that the memory of the systems and methods illustrated herein are intended to include, but are not limited to, the memory and any other suitable types of memory.

It should be understood that the memory is exemplary but not restrictive. For example, the memory in the embodiment of the application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and direct rambus RAM (DR RAM), and the like. That is, the memory of the systems and methods illustrated herein are intended to include, but are not limited to, the memory and any other suitable types of memory.

The embodiments of the application also provide a computer-readable storage medium for storing computer programs.

Optionally, the computer-readable storage medium may be applied to the network device in the embodiments of the application, and the computer program enables the computer to execute the corresponding process implemented by the network device in each method of the embodiment of the application, which is not repeated herein for conciseness.

Optionally, the computer-readable storage medium may be applied to the mobile terminal/terminal device in the embodiments of the application, and the computer program enables the computer to execute the corresponding process implemented by the mobile terminal/terminal device in each method of the embodiments of the application, which is not repeated herein for conciseness.

The embodiments of the application also provide a computer program product, including computer program instructions.

Optionally, the computer program product may be applied to the network device in the embodiments of the application, and the computer program instructions enable the computer to execute the corresponding process implemented by the network device in each method of the embodiments of the application, which is not repeated herein for conciseness.

Optionally, the computer program product may be applied to the mobile terminal/terminal device in the embodiments of the application, and the computer program instructions enable the computer to execute the corresponding process implemented by the mobile terminal/terminal device in each method of the embodiments of the application, which is not repeated herein for conciseness.

The embodiments of the application also provide a computer program.

Optionally, the computer program may be applied to the network device in the embodiments of the application. When the computer program runs on the computer, the computer is enabled to execute the corresponding process implemented by the network device in each method of the embodiments of the application, which is not repeated herein for conciseness.

Optionally, the computer program may be applied to the mobile terminal/terminal device in the embodiments of the application. When the computer program runs on the computer, the computer is enabled to execute the corresponding process implemented by the mobile terminal/terminal device in each method of the embodiments of the application, which is not repeated herein for conciseness.

A person of ordinary skill in the art may realize that the units and algorithm steps of the illustrated examples in combination with the embodiments disclosed herein can be implemented by electronic hardware or a combination of computer software and electronic hardware. Whether the functions are executed by hardware or software depends on the specific application and design constraint conditions of the technical solution. Professionals and technicians can use different methods for each specific application to implement the described functions, but such implementation should not be considered beyond the scope of this application.

Those skilled in the art can clearly understand that, for the convenience and conciseness of description, the specific working process of the illustrated system, device, and unit can refer to the corresponding process in the method embodiments, which is not repeated herein.

In the embodiments provided in the application, it should be understood that the disclosed system, device, and method may be implemented in other ways. For example, the illustrated device embodiments are only illustrative. For example, the division of the unit is only a logical function division, and there may be other division methods in actual implementation. For example, multiple units or components can be combined or integrated into another system, or some features can be omitted or not implemented. In addition, the displayed or discussed mutual coupling or direct coupling or communication connection may be indirect coupling or communication connection through some interfaces, devices, or units and may be in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, each functional unit in the various embodiments of the application may be integrated into one processing unit, each unit may be physically disposed separately, or two or more units may be integrated into one unit.

If the function is implemented in the form of a software functional unit and sold or used as an independent product, the functional unit can be stored in a computer readable storage medium. Accordingly, the technical solution of the application in essence, part of the technical solution that contributes to the current technology, or part of the technical solution can be embodied in the form of a software product, and the computer software product is stored in a storage medium and includes several instructions for enabling a computer device (which may be a personal computer, a server, a network device, and the like.) to execute all or part of the steps of the methods illustrated in the various embodiments of the application. The storage media include media, such as U disks, mobile hard disks, read-only memory (ROM), random access memory (RAM), disks, compact disks, and other media that can store program codes.

The above are only specific implementations of the application, and the protection scope of the application is not limited thereto. All changes or replacements within the technical scope disclosed in the application that those persons skilled in the art can easily conceive should be covered within the protection scope of the application. Therefore, the protection scope of the application shall be subject to the protection scope of the claims.

What is claimed is:

1. A wireless communication method, comprising:
   receiving, by a first terminal, N sidelink data channels sent by a second terminal on N frequency domain resources, wherein the N frequency domain resources correspond one-to-one to the N sidelink data channels, N is an integer greater than 1, and the frequency domain resources are carriers or bandwidth parts (BWPs);
   determining M frequency domain resources among the N frequency domain resources, wherein M is a positive integer and M<N, and wherein determining the M frequency domain resources among the N frequency domain resources comprises:
      determining the M frequency domain resources among the N frequency domain resources according to first information, wherein the first information is used to indicate the M a frequency domain resources used for transmitting the sidelink feedback information of the N sidelink data channels; and
   sending, by the first terminal, the sidelink feedback information of the N sidelink data channels to the second terminal on the M frequency domain resources,
   wherein sending, by the first terminal, the sidelink feedback information of the N sidelink data channels to the second terminal on the M frequency domain resources comprises:
   sending, by the first terminal, a sidelink feedback channel on each of the M frequency domain resources, wherein each sidelink feedback channel carries the sidelink feedback information of the N sidelink data channels.

2. The method according to claim 1, wherein:
   if same data is transmitted in the N sidelink data channels, the sidelink feedback information of the N sidelink data channels is one piece of sidelink feedback information corresponding to the same data; or
   if different data is transmitted in the N sidelink data channels, the sidelink feedback information of the N sidelink data channels comprises sidelink feedback information corresponding to each of the different data.

3. The method according to claim 2, wherein if the same data is transmitted in the N sidelink data channels, the sidelink feedback information corresponding to the same data is determined according to a combined decoding result of the N sidelink data channels.

4. The method according to claim 1, wherein the step of determining the M frequency domain resources among the N frequency domain resources comprises:
   further determining the M frequency domain resources among the N frequency domain resources according to at least one of a channel busy rate (CBR) of a resource pool on the N frequency domain resources, measurement results of the sidelink data channels on the N frequency domain resources, transmission time of the N sidelink data channels, or indices of the N frequency domain resources.

5. The method according to claim 4, wherein determining the M frequency domain resources among the N frequency domain resources according to at least one of the CBR of the resource pool on the N frequency domain resources, the measurement results of the sidelink data channels on the N frequency domain resources, the transmission time of the N sidelink data channels, or the indices of the N frequency domain resources, comprises:

determining that the M frequency domain resources comprise M frequency domain resources with lowest CBRs on the N frequency domain resources; or determining that the M frequency domain resources comprise M frequency domain resources with a highest measured reference signal receiving power (RSRP) on the N frequency domain resources if the measurement result is the measurement result of the RSRP of the sidelink data channel; or determining that the M frequency domain resources comprise a frequency domain resource corresponding to a sidelink data channel with latest transmission time among the N sidelink data channels; or determining that the M frequency domain resources comprise M frequency domain resources with smallest indices among the N frequency domain resources; or determining that the M frequency domain resources comprise a primary carrier among the N frequency domain resources if the frequency domain resources are the carriers; or determining that the M frequency domain resources comprise a BWP corresponding to the primary carrier if the frequency domain resources are the BWPs.

6. The method according to claim 4, wherein the first information is sent by the second terminal to the first terminal; or the first information is sent by a network device to the first terminal; or the first information is sent by a group head terminal to the first terminal.

7. The method according to claim 6, wherein the second terminal sends the first information to the first terminal through sidelink control information (SCI) or a PC5-RRC signaling;

the network device sends the first information through a broadcast message or a radio resource control (RRC) signaling; and the group head terminal sends the first information to the first terminal through the SCI or the PC5-RRC signaling.

8. A terminal device, comprising:

a communication transceiver configured to receive N sidelink data channels sent by a second terminal on N frequency domain resources, wherein the N frequency domain resources correspond one-to-one to the N sidelink data channels, where N is an integer greater than 1, and the frequency domain resources are carriers or bandwidth parts (BWPs);

a determining processor configured to:

determine M frequency domain resources among the N frequency domain resources according to first information, wherein the first information is used to indicate the M frequency domain resources used for transmitting the sidelink feedback information of the N sidelink data channels; and send the sidelink feedback information of the N sidelink data channels to the second terminal on the M frequency domain resources, where M is a positive integer, and M<N, wherein the communication transceiver is further configured to:

send a sidelink feedback channel on each of the M frequency domain resources, wherein each sidelink feedback channel carries the sidelink feedback information of the N sidelink data channels.

9. The terminal device according to claim 8, wherein if same data is transmitted in the N sidelink data channels, the sidelink feedback information of the N sidelink data channels is one piece of sidelink feedback information corresponding to the same data; or if different data is transmitted in the N sidelink data channels, the sidelink feedback information of the N sidelink data channels comprises sidelink feedback information corresponding to each of the different data.

10. The terminal device according to claim 9, wherein if the same data is transmitted in the N sidelink data channels, the sidelink feedback information corresponding to the same data is determined according to a combined decoding result of the N sidelink data channels.

11. The terminal device according to claim 8, wherein the determining processor is further configured to:

determine the M frequency domain resources among the N frequency domain resources according to at least one of a channel busy rate (CBR) of a resource pool on the N frequency domain resources, measurement results of the sidelink data channels on the N frequency domain resources, transmission time of the N sidelink data channels, or indices of the N frequency domain resources.

12. The terminal device according to claim 11, wherein the determining processor is further configured to:

determine that the M frequency domain resources comprise M frequency domain resources with lowest CBRs on the N frequency domain resources; or determine that the M frequency domain resources comprise M frequency domain resources with a highest measured reference signal receiving power (RSRP) on the N frequency domain resources if the measurement result is the measurement result of the RSRP of the sidelink data channel; or determine that the M frequency domain resources comprise a frequency domain resource corresponding to a sidelink data channel with latest transmission time among the N sidelink data channels; or determine that the M frequency domain resources comprise M frequency domain resources with smallest indices among the N frequency domain resources; or determine that the M frequency domain resources comprise a primary carrier among the N frequency domain resources if the frequency domain resources are the carriers; or determine that the M frequency domain resources comprise a BWP corresponding to the primary carrier if the frequency domain resources are the BWPs.

13. The terminal device according to claim 11, wherein the first information is sent by the second terminal to the terminal device; or the first information is sent by a network device to the terminal device; or the first information is sent by a group head terminal to the terminal device.

14. The terminal device according to claim 13, wherein the second terminal sends the first information to the terminal device through sidelink control information (SCI) or a PC5-RRC signaling;

the network device sends the first information through a broadcast message or a radio resource control (RRC) signaling; and the group head terminal sends the first information to the terminal device through the SCI or the PC5-RRC signaling.

15. A chip, comprising:
a processor; and
a memory storing a computer program,
wherein the processor is configured to call and run the computer program from the memory, to cause a terminal device disposed with the chip to execute operations comprising:
receiving N sidelink data channels sent by a second terminal on N frequency domain resources, wherein the N frequency domain resources correspond one-to-one to the N sidelink data channels, N is an integer greater than 1, and the frequency domain resources are carriers or bandwidth parts (BWPs);
determining M frequency domain resources among the N frequency domain resources according to first information, wherein the first information is used to indicate the M frequency domain resources used for transmitting the sidelink feedback information of the N sidelink data channels, M is a positive integer and M<N; and
sending the sidelink feedback information of the N sidelink data channels to the second terminal on the M frequency domain resources, by:
sending a sidelink feedback channel on each of the M frequency domain resources, wherein each sidelink feedback channel carries the sidelink feedback information of the N sidelink data channels.

16. The chip according to claim 15, wherein
if same data is transmitted in the N sidelink data channels, the sidelink feedback information of the N sidelink data channels is one piece of sidelink feedback information corresponding to the same data; or
if different data is transmitted in the N sidelink data channels, the sidelink feedback information of the N sidelink data channels comprises sidelink feedback information corresponding to each of the different data.

17. The chip according to claim 16, wherein if the same data is transmitted in the N sidelink data channels, the sidelink feedback information corresponding to the same data is determined according to a combined decoding result of the N sidelink data channels.

18. The chip according to claim 15, wherein the processor is configured to call and run the computer program from the memory, to cause the terminal device disposed with the chip to execute operations further comprising:
determining the M frequency domain resources among the N frequency domain resources according to at least one of a channel busy rate (CBR) of a resource pool on the N frequency domain resources, measurement results of the sidelink data channels on the N frequency domain resources, transmission time of the N sidelink data channels, or indices of the N frequency domain resources.

19. The chip according to claim 18, wherein the processor is configured to call and run the computer program from the memory, to cause the terminal device disposed with the chip to execute operations further comprising:
determining that the M frequency domain resources comprise M frequency domain resources with lowest CBRs on the N frequency domain resources; or
determining that the M frequency domain resources comprise M frequency domain resources with a highest measured reference signal receiving power (RSRP) on the N frequency domain resources if the measurement result is the measurement result of the RSRP of the sidelink data channel; or
determining that the M frequency domain resources comprise a frequency domain resource corresponding to a sidelink data channel with latest transmission time among the N sidelink data channels; or
determining that the M frequency domain resources comprise M frequency domain resources with smallest indices among the N frequency domain resources; or
determining that the M frequency domain resources comprise a primary carrier among the N frequency domain resources if the frequency domain resources are the carriers; or
determining that the M frequency domain resources comprise a BWP corresponding to the primary carrier if the frequency domain resources are the BWPs.

20. The chip according to claim 18, wherein
wherein the first information is sent by the second terminal to the terminal device; or
the first information is sent by a network device to the terminal device; or
the first information is sent by a group head terminal to the terminal device.

* * * * *